United States Patent
Massie

(10) Patent No.: US 10,673,082 B2
(45) Date of Patent: Jun. 2, 2020

(54) SYSTEM AND METHOD FOR FUEL CELL CATHODE GAS HUMIDIFICATION

(71) Applicant: Parker-Hannifin Corporation, Cleveland, OH (US)

(72) Inventor: Daniel C. Massie, Mission Viejo, CA (US)

(73) Assignee: PARKER-HANNIFIN CORPORATION, Cleveland, OH (US)

(*) Notice: Subject to any disclaimer, the term of this patent is extended or adjusted under 35 U.S.C. 154(b) by 150 days.

(21) Appl. No.: 15/368,798

(22) Filed: Dec. 5, 2016

(65) Prior Publication Data

US 2017/0170499 A1 Jun. 15, 2017

Related U.S. Application Data

(60) Provisional application No. 62/265,127, filed on Dec. 9, 2015.

(51) Int. Cl.
| | | |
|---|---|---|
| H01M 8/04 | (2016.01) | |
| C01B 13/02 | (2006.01) | |
| H01M 8/04119 | (2016.01) | |
| H01M 8/1007 | (2016.01) | |
| H01M 8/04082 | (2016.01) | |
| H01M 8/1018 | (2016.01) | |

(52) U.S. Cl.
CPC ..... *H01M 8/04126* (2013.01); *C01B 13/0214* (2013.01); *H01M 8/04201* (2013.01); *H01M 8/1007* (2016.02); *H01M 8/04216* (2013.01); *H01M 2008/1095* (2013.01)

(58) Field of Classification Search
CPC ......... H01M 8/04126; H01M 8/04216; H01M 8/1007; H01M 8/04201; C01M 13/0214
See application file for complete search history.

(56) References Cited

U.S. PATENT DOCUMENTS

| 3,795,544 A | 3/1974 | Clausi et al. |
| 7,344,789 B2 | 3/2008 | Barber et al. |
| 7,645,530 B2 | 1/2010 | Buechi et al. |
| 7,993,791 B2 | 8/2011 | Zhamu et al. |

(Continued)

FOREIGN PATENT DOCUMENTS

| WO | 2003/011751 A1 | 2/2003 |
| WO | 2012/099413 A2 | 7/2012 |

OTHER PUBLICATIONS

An et al., "The dual role of hydrogen peroxide in fuel cells", Science Bulletin, vol. 60, No. 1, 2015, pp. 55-64.

(Continued)

*Primary Examiner* — Ula C Ruddock
*Assistant Examiner* — Frank A Chernow
(74) *Attorney, Agent, or Firm* — Renner, Otto, Boisselle & Sklar, LLP

(57) ABSTRACT

A system for humidifying a fuel cell includes: a container including an aqueous solution of hydrogen peroxide; a source of pressurized gas coupled to the container for pressurizing the hydrogen peroxide solution container; and a catalyst reaction chamber including a catalyst for decomposing hydrogen peroxide into a gaseous mixture of water vapor and oxygen. The gaseous mixture of water vapor and oxygen is combined with a flow of reactant oxidant gas to obtain a humidified oxidant gas stream, which is delivered to the fuel cell.

8 Claims, 1 Drawing Sheet

(56) References Cited

U.S. PATENT DOCUMENTS

| | | | |
|---|---|---|---|
| 2004/0202903 A1* | 10/2004 | deVos | C01B 3/065 429/421 |
| 2008/0053065 A1 | 3/2008 | Hobson et al. | |
| 2008/0247926 A1 | 10/2008 | Osterloh | |
| 2009/0050522 A1 | 2/2009 | Barber et al. | |
| 2010/0055517 A1 | 3/2010 | Uzhinsky et al. | |
| 2014/0113819 A1 | 4/2014 | Niksa et al. | |

OTHER PUBLICATIONS

Kim, Taegyu, "Micro Power Generation from Micro Fuel Cell Combined with Micro Methanol Reformer", Micro Electronic and Mechanical Systems, Kenichi Takahata (Ed.), ISBN: 978-953-307-027-8, InTech, Dec. 2009, Available from: http://www.intechopen.com/books/micro-electronic-and-mechanicalsystems/micro_power_generation_from_micro_fuel_cell_combined_with_micro_methanol_reformer.

* cited by examiner

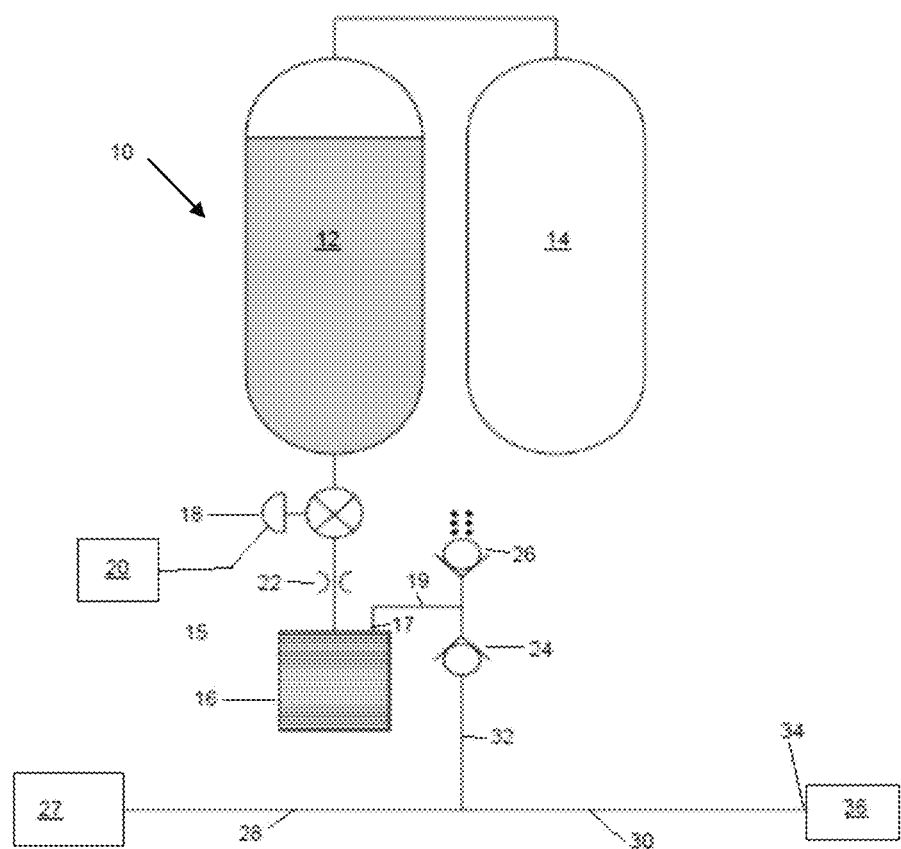

SYSTEM AND METHOD FOR FUEL CELL CATHODE GAS HUMIDIFICATION

TECHNICAL FIELD

The present invention relates to humidification of oxygen or air, and more particularly, to the field of providing humidified reactant gas for electrochemical devices located in airborne, terrestrial, and marine environments.

BACKGROUND

A proton exchange membrane (PEM) fuel cell includes a cathode area, an anode area and an ion-exchange membrane that separates these areas. In operation, the anode area is supplied with, for example, hydrogen in gaseous form, and the cathode area is supplied with, for example, oxygen or ambient air containing oxygen. In the presence of a catalytic converter, the hydrogen molecules split into protons and electrons. In the cathode area, the oxygen molecules absorb electrons and are ionized into $O^{2-}$ ions. The protons formed in the anode area diffuse through the membrane to the cathode area and the electrons are supplied to the cathode area by way of a separate electrical conductor, with an electrical load being inserted. The protons and oxygen ions react to form water.

In order for the fuel cell to function most effectively, adequate membrane hydration is needed. The protons are transported in the membrane in the form of $H_3O^+$ ions, which is dependent upon the appropriate water content of the membrane. If the humidity is not substantially constant across the membrane, the fuel cell cannot be kept at optimum operation, as dryness makes it more difficult for proton transport.

Membrane hydration may be achieved by humidifying the fuel (e.g., the hydrogen gas) and oxidant gases (e.g., oxygen or air) prior to their introduction into the fuel cell. Generally, pre-humidification systems are complex, relatively expensive and/or require an external heat source.

SUMMARY

In one aspect of the invention there is provided a system for humidifying a fuel cell. The system includes: a container including an aqueous solution of hydrogen peroxide; a source of pressurized gas coupled to the container for pressurizing the hydrogen peroxide solution container; a catalyst reaction chamber comprising a catalyst for decomposing hydrogen peroxide into a gaseous mixture of water vapor and oxygen; a delivery passageway coupled to the hydrogen peroxide solution container for directing a stream of hydrogen peroxide solution from the container to the catalyst reaction chamber; a controlled valve located in the delivery passageway for controlling the flow of hydrogen peroxide solution; control means coupled to the controlled valve and configured to modulate the flow of hydrogen peroxide solution to the catalyst reaction chamber; and an exit passageway coupled to the catalyst reaction chamber for directing a stream of the gaseous mixture of water vapor and oxygen produced in the reaction chamber to the fuel cell.

The system may further include a source of reactant oxidant gas coupled to the exit passageway. In one embodiment, the reactant oxidant gas is air. In another embodiment, the reactant oxidant gas is oxygen.

In one embodiment, the solution of hydrogen peroxide and water is 40% to 70% hydrogen peroxide by weight.

The catalyst of the catalyst reaction chamber may include silver.

The source of pressurized gas used to pressurize the container of hydrogen peroxide solution may be pressurized nitrogen gas.

The control means for controlling the flow of hydrogen peroxide to the catalyst reaction chamber may include a controller and a metering orifice downstream of the controlled valve.

The system may further include a pressure release valve located in the exit passageway.

The system may further include means for combining a stream of reactant oxidant gas from the reactant oxidant source with a stream of the gaseous mixture of water vapor and oxygen produced in the reaction chamber for delivery to the fuel cell.

In another aspect of the invention, there is provided a process for humidifying a fuel cell. The process includes the steps of: providing a source of compressed gas; pressurizing a container containing an aqueous solution of hydrogen peroxide with the compressed gas from the compressed gas source; controlling a flow of hydrogen peroxide solution to a decomposition chamber, the decomposition chamber comprising a decomposition catalyst; at least partially decomposing the hydrogen peroxide of the hydrogen peroxide solution to form a gaseous mixture of water vapor and oxygen; combining the gaseous mixture of water vapor and oxygen with a flow of reactant oxidant gas to obtain a humidified oxidant gas stream; and delivering the humidified oxidant gas stream to the fuel cell.

The process may further include the step of venting a flow of the gaseous mixture of water vapor and oxygen prior to combining with a flow of reactant oxide gas when a pressure within the decomposition chamber exceeds a predetermined safety pressure.

BRIEF DESCRIPTION OF THE DRAWING

FIG. 1 is a simplified schematic diagram showing exemplary components and an exemplary arrangement of components that may be used for humidifying a fuel cell in accordance with the present invention.

DETAILED DESCRIPTION

Electrochemical devices such as fuel cells are becoming increasingly recognized as viable and economical means of replacing conventional power generation systems with clean, reliable, and quiet energy technologies. The aerospace industry, for example, is developing proton exchange membrane (PEM) fuel cell systems for widespread use on commercial aircraft to generate auxiliary power during in-flight electrical emergencies and oxygen-depleted air for fire suppression.

When deployed, these systems are required to start-up quickly and reliably in a variety of challenging operating environments. PEM fuel cells operate normally when the active membrane is warm and moist. The reactant gases received by the PEM fuel cells, e.g., hydrogen and oxygen, are typically dry. Once the fuel cell is operating, the water generated in the electrochemical reaction can be used to increase the humidity of the reactant gas. However, in order to initiate reliable and robust start-up and maximize the lifespan of the fuel cell, a robust humidification system can be used to supplement reactant gases.

Humidified oxygen may be produced by decomposing hydrogen peroxide ($H_2O_2$) into water and oxygen. In the presence of a catalyst, hydrogen peroxide will degenerate to form water and oxygen:

$$2H_2O_2 \xrightarrow{\text{catalyst}} 2H_2O + O_2$$

The catalyst may include, for example, a high surface area silver catalyst. The high surface area silver catalyst may be provided in the form of a silver mesh or granular, low density nano-porous silver catalyst.

Examples of other useful catalysts include platinum mixed oxides, vanadium-cobalt oxides, nickel, platinum, rhodium supported on zirconia, iron, chromium, and mixtures of these catalysts.

The hydrogen peroxide may be supplied as a liquid mixture of hydrogen peroxide and water. The $H_2O_2/H_2O$ liquid mixture may contain between about 40% and about 70% hydrogen peroxide by weight. Preferably, the $H_2O_2/H_2O$ liquid mixture contains between about 60% to about 70% hydrogen peroxide by weight. The $H_2O_2/H_2O$ liquid mixture is commercially available and is relatively stable for long periods of time.

In one embodiment, the hydrogen peroxide aqueous solution contains about 70% hydrogen peroxide/30% water. This solution has a freezing point of approximately −40° C., which is low enough to ensure the solution will be in liquid state at elevated temperatures. In addition, with this composition, the heat released during decomposition is greater than the heat of vaporization, which means the solution will be completely converted to steam and gas.

Referring to FIG. 1, an embodiment of a system 10 for humidifying a fuel cell includes a container 12 for containing a supply of an aqueous solution of hydrogen peroxide, a pressurized vessel 14 containing a supply of compressed gas fluidly connected to the container of hydrogen peroxide solution 12, a catalyst reaction chamber 16 fluidly connected to container 12 and to a fuel cell 36, and a controller 20 for controlling the flow of pressurized hydrogen peroxide solution from the container 12 to the catalyst reaction chamber 16. The system further includes appropriate piping and valves to allow reactant oxidant gas from reactant oxidant source 27 to be introduced to the cathode side of the fuel cell 27 and hydrogen gas from a hydrogen gas source (not shown) to be introduced to the anode side of fuel cell 27. The interconnection between the valves and controllers therefor are conventional and are not otherwise shown.

The catalyst chamber 16 includes a catalyst for decomposing the hydrogen peroxide of the hydrogen peroxide solution to a high temperature mixture of oxygen and water in the form of water vapor or steam. The catalyst may be, for example, a silver mesh. The catalyst chamber may be thermally insulated to accelerate the decomposition reaction and to protect users from the exothermic decomposition reaction.

In operation, hydrogen peroxide solution is delivered to the catalyst chamber 16 by pressurizing the hydrogen peroxide solution container 12 by an external source, such as a pressurized vessel 14 containing a compressed gas connected to container 12. In one embodiment, the pressurized gas is nitrogen. The pressurized gas will drive the hydrogen peroxide solution into the catalyst chamber 16. By employing a second container 14 to pressurize the hydrogen peroxide solution container 12, the flow of hydrogen peroxide solution can be controlled by opening a control valve and metered through a flow orifice.

When humidification of the fuel cell 36 is required, a control valve 18 between container 12 and the inlet 15 to the catalyst chamber is opened. Control valve 18 may be electronically controlled by controller 20. Flow of aqueous hydrogen peroxide solution can be modulated by opening and closing control valve 18. Control valve 18 may be, for example, a solenoid valve. A metering orifice 22 downstream of the control valve 18 will throttle the flow of aqueous hydrogen peroxide into the catalyst chamber 16.

A check valve 24 in passage 19 from the catalyst chamber outlet 17 allows only gaseous flow to move from the catalyst chamber 16 to the reactant oxidant (i.e., cathode) stream 28. A relief valve 26 in passage 19 protects the catalyst chamber 16 from bursting if the decomposition reaction becomes too vigorous and exceeds the relieving capacity of check valve 24. Because the product gases of the decomposition reaction contain only water and oxygen, the gases can be safely released to the environment.

The high temperature oxygen-steam mixture output from the catalyst reaction chamber may be of too high a temperature to be introduced directly to the fuel cell membrane. The stream 32 of gaseous mixture of water and oxygen from the catalyst chamber 16 may be combined with the flow of reactant oxidant gas 28 from reactant oxidant source 27 to obtain a humidified oxidant stream 30, which is delivered to the fuel cell 36. By appropriate operation of the system, both the temperature and pressure of the humidified oxidant stream to the fuel cell can be precisely controlled.

The process and system described herein provides several advantages over conventional fuel cell humidification processes and systems. For example, the working fluid, aqueous $H_2O_2$, provides a robust and self-contained means to generate humidified oxygen in extreme temperature environments. Replenishment of the working fluid may be easily carried out by, for example, by replacement cartridges containing aqueous hydrogen peroxide solution. Furthermore, the working fluid is relatively inexpensive and readily available.

With the configuration of the components of the humidification system, an external heat source is not required in order to initiate decomposition of the hydrogen peroxide or to provide hot and humid oxygen to the cathode of the fuel cell. The presently described humidification process and system is easily controlled with a single valve. In addition passive safety features are included in the configuration.

The described process and system are much simplified over conventional systems, which results in lower operation costs and improved long term stability.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A system for humidifying a fuel cell, the system comprising:
   a container including an aqueous solution of hydrogen peroxide;
   a source of pressurized gas coupled to the container for pressurizing the hydrogen peroxide solution container, wherein the source is remote from the container;
   a catalyst reaction chamber comprising a catalyst for decomposing hydrogen peroxide into a gaseous mixture of water vapor and oxygen, wherein the catalyst reaction chamber is remote from the container;
   a delivery passageway coupled to the hydrogen peroxide solution container for directing a stream of hydrogen peroxide solution from the container to the catalyst reaction chamber;
   a controlled valve located in the delivery passageway for controlling the flow of hydrogen peroxide solution;
   control means coupled to the controlled valve and configured to modulate the flow of hydrogen peroxide solution to the catalyst reaction chamber; and
   an exit passageway coupled to the catalyst reaction chamber for directing a stream of the gaseous mixture of water vapor and oxygen produced in the reaction chamber to the fuel cell; and
   further comprising a separate source of reactant oxidant gas coupled to the exit passageway via a reactant oxidant gas passageway and means for combining a stream of the reactant oxidant gas from the reactant oxidant source with the stream of the gaseous mixture of water vapor and oxygen produced in the reaction chamber, the exit passageway configured to direct the combined streams to the fuel cell.

2. The system of claim 1, wherein the reactant oxidant gas comprises air.

3. The system of claim 1, wherein the reactant oxidant gas comprises oxygen.

4. The system of claim 1, wherein the solution of hydrogen peroxide and water comprises 40% to 70% hydrogen peroxide by weight.

5. The system of claim 1, wherein the catalyst comprises silver.

6. The system of claim 1, wherein the source of pressurized gas comprises pressurized nitrogen gas.

7. The system of claim 1, wherein the control means comprises a controller and a metering orifice downstream of the controlled valve.

8. The system of claim 1, further comprising a pressure release valve located in the exit passageway.

* * * * *